United States Patent
Iida et al.

(10) Patent No.: US 6,760,290 B1
(45) Date of Patent: Jul. 6, 2004

(54) OPTICAL DISC AND OPTICAL DISC DRIVE

(75) Inventors: Tamotsu Iida, Ibaraki (JP); Yoshiro Yoda, Shibuya-ku (JP); Kazuo Ito, Daito (JP)

(73) Assignees: Hitachi Maxell Limited, Osaka (JP); Olympus Optical Corporation Limited, Tokyo (JP); Sanyo Electric Corporation Limited, Osaka (JP)

(*) Notice: Subject to any disclaimer, the term of this patent is extended or adjusted under 35 U.S.C. 154(b) by 108 days.

(21) Appl. No.: 10/030,244
(22) PCT Filed: Jul. 6, 2000
(86) PCT No.: PCT/JP00/04474
§ 371 (c)(1), (2), (4) Date: Feb. 19, 2002
(87) PCT Pub. No.: WO01/04894
PCT Pub. Date: Jan. 18, 2001

(30) Foreign Application Priority Data

Jul. 9, 1999 (JP) .......................................... 11/195212

(51) Int. Cl.⁷ ................................................. G11B 7/00
(52) U.S. Cl. .................................. 369/53.21; 369/59.25
(58) Field of Search .......................... 369/275.3, 47.48, 369/47.33, 59.25, 47.32, 47.34, 53.21

(56) References Cited

U.S. PATENT DOCUMENTS

| RE35,839 E | * | 7/1998 | Asai et al. ..................... 369/3 |
| 5,818,812 A | * | 10/1998 | Moribe et al. ........... 369/275.1 |
| 6,272,086 B1 | * | 8/2001 | Jaquette et al. |
| 6,288,989 B1 | * | 9/2001 | Ro et al. ................. 369/47.13 |
| 6,580,682 B1 | * | 6/2003 | Kamperman et al. ..... 369/275.3 |

FOREIGN PATENT DOCUMENTS

| JP | A 8-147704 | 6/1996 |
| JP | A 10-199032 | 7/1998 |
| JP | 10-326462 | * 8/1998 .............. 369/47.13 |

* cited by examiner

*Primary Examiner*—Nabil Hindi
(74) *Attorney, Agent, or Firm*—Oliff & Berridge, PLC

(57) ABSTRACT

A disc-shaped optical record carrier includes a first area having a spiral track extending in a first direction from an inner side on the disc, and a second area having a spiral track extending in a second direction opposite to the first direction, from an outer side on the disc located on the same plane as the first area on the disc, wherein one of the first and second areas is assigned a recordable area and the other is assigned a read only area.

3 Claims, 4 Drawing Sheets

OPTICAL DISC AND OPTICAL DISC DRIVE

BACKGROUND OF THE INVENTION

The present invention relates generally to information record carriers using optical means and drives for driving the same, and more particularly to an information record carrier that stores user data for use with a user and controls an access to the user data and a drive for driving the same. The present invention is directed, for example, to an optical disc that records video information, voice information, text information, software, and the like and stores a security code used to access the optical disc, and a drive for driving the same.

In general, an optical disc divides an area into a lead-in area, a (user) data area, and a lead-out data. The lead-in area, located outside the user data area and provided at a side from which the disc is first accessed, includes a control area. The lead-out area is a buffer area indicative of an end of reading, and provided at the innermost or outermost circumference opposite to the lead-in area. The lead-in and lead-out areas are those which a user does not access, and typically store control information and test information. On the other hand, the data area is those which a user may utilize, and a recordable and reproducible disc uses this area to store information (or user data). The control area and data area are addressed in a similar manner, and an optical head may access both areas relying upon the address. In addition, the lead-in, lead-out and user data areas are generally recorded in the same recording manner.

Recordable and reproducible optical discs are subject to falsification and deletion of their recorded contents, and the stable preservation of recorded contents would be difficult. It is also undesirable that an unauthorized person accesses and leaks out recorded information in a recordable and reproducible optical disc. However, the mere prevention of unauthorized copying, as in Japanese Laid-Open Patent Application No. 10-199032, is an insufficient solution for this problem. On the other hand, Japanese Laid-Open Patent Application No. 8-147704 suggests that security data other than primary data (or user data) be recorded in a wobbling area for security purposes. Although this reference as an example uses second modulation (or wobbling) means as data superimposing means to store security data in addition to the primary data in the user data area, the disclosure appears to suppose a non-rewritable optical disc.

Thus, heretofore, no inexpensive and effective method have been proposed to preserve recorded contents of a recordable and reproducible, preferably standardized, optical disc, as well as to restrict an access to the disc so as to maintain recorded contents' security. Therefore, current rewritable optical discs are in a defenseless state and it is currently difficult to restrict an access to an optical disc and to preserve an originality of its recorded contents.

For example, a conventional method for making an optical disc non-writable may maintain a stable preservation, but cannot prevent a leakage of recorded contents. In addition, when an optical disc is not standardized, the security would undesirably lead to a complicated and expensive system. For instance, as seen in standardized and commercialized products like certain medical-use optical discs, a partial modification of a standardized optical disc would maintain the security but lead to a special, complicated and expensive system architecture.

BRIEF SUMMARY OF THE INVENTION

In order to solve the above disadvantages, it is an exemplified object of the present invention to provide an optical disc with secure ID data for control over recording and reproducing of the optical disc, and thereby to inexpensively achieve the stable preservation and security maintenance of recorded contents.

In order to achieve the above object, a recordable and reproducible optical disc of one aspect of the present invention includes a user data area and a control area which are continuously and integrally arranged, wherein each record area in the user data and control areas is divided along a circumference, each unit of the divided circumference is addressed, and each addressed unit is divided into a plurality of data lines so that the optical disc may be recorded, and wherein control data including error-detectable code data and ID data is recorded at least part of data lines in the control area having an address among addresses in the circumferential record areas. According to this optical disc, the control data is recorded partially or entirely in the control area and, in any event, is not necessarily recorded in the entire circumference on the disc. In addition, the control data stores only data amount corresponding to a narrow record area.

A recording method of another aspect of the present invention for a recordable and reproducible optical disc includes a user data area and a control area which are continuously and integrally arranged, wherein each record area in the user data and control areas is divided along a circumference, each unit of the divided circumference is addressed, and each addressed unit is divided into a plurality of data lines so that the optical disc may be recorded, the method including a step of recording data in part of the control area using a synchronous pattern having a minimum basic period different from a minimum basic period used for a synchronous pattern for reproducing data divided and recorded in the data lines. This recording method employs synchronous patterns using two types of minimum basic periods.

An optical disc drive of still another aspect of the present invention for driving a recordable and reproducible optical disc includes a user data area and a control area which are continuously and integrally arranged, wherein each record area in the user data and control areas is divided along a circumference, each unit of the divided circumference is addressed, and each addressed unit is divided into a plurality of data lines so that the optical disc may be recorded, and wherein control data including error-detectable code data is recorded at least part of circumferentially discontinuous and divided data lines in the control area having an address among addresses in the circumferential record areas, includes an optical pick-up for reproducing the optical disc, a signal processor, connected to the optical pick-up, for processing an output from the optical pick-up, a memory for storing a security program and security data relating to information on control data, and a controller for operating in accordance with the security program, and allows the optical pick-up and signal processor to record and reproduce the user data when the control data reproduced by the optical pick-up accords with the security data and when no error is detected during a reproduction action. This optical disc drive is compatible with the above optical disc.

Other objects and further features of the present invention will become readily apparent from the following description of preferred embodiments with reference to accompanying drawings.

DETAILED DESCRIPTION OF THE PREFERRED EMBODIMENTS

Figure 1:
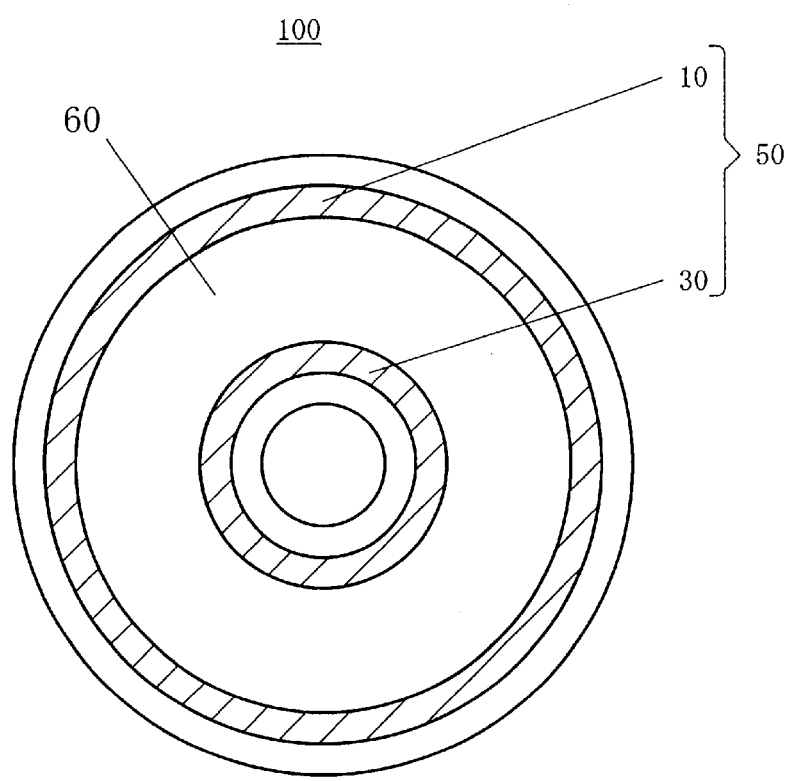
FIG. 1 is a plane view of an optical disc according to the present invention.
Figure 2:
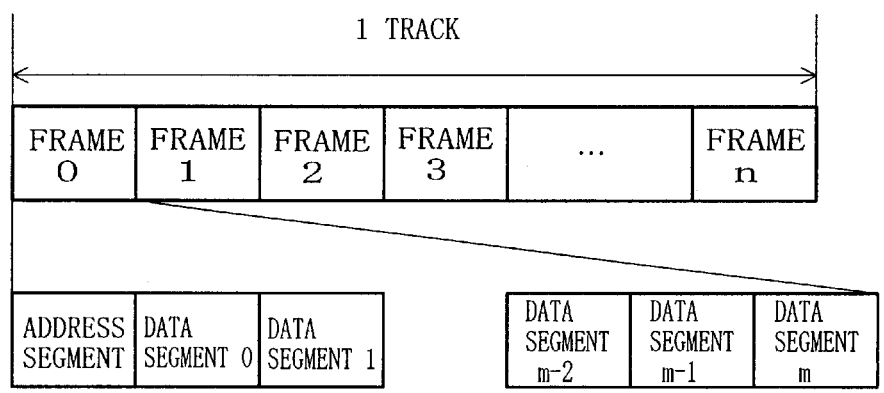
FIG. 2 is a schematic block diagram for explaining a structure of lead-in area shown in FIG. 1.
Figure 3:
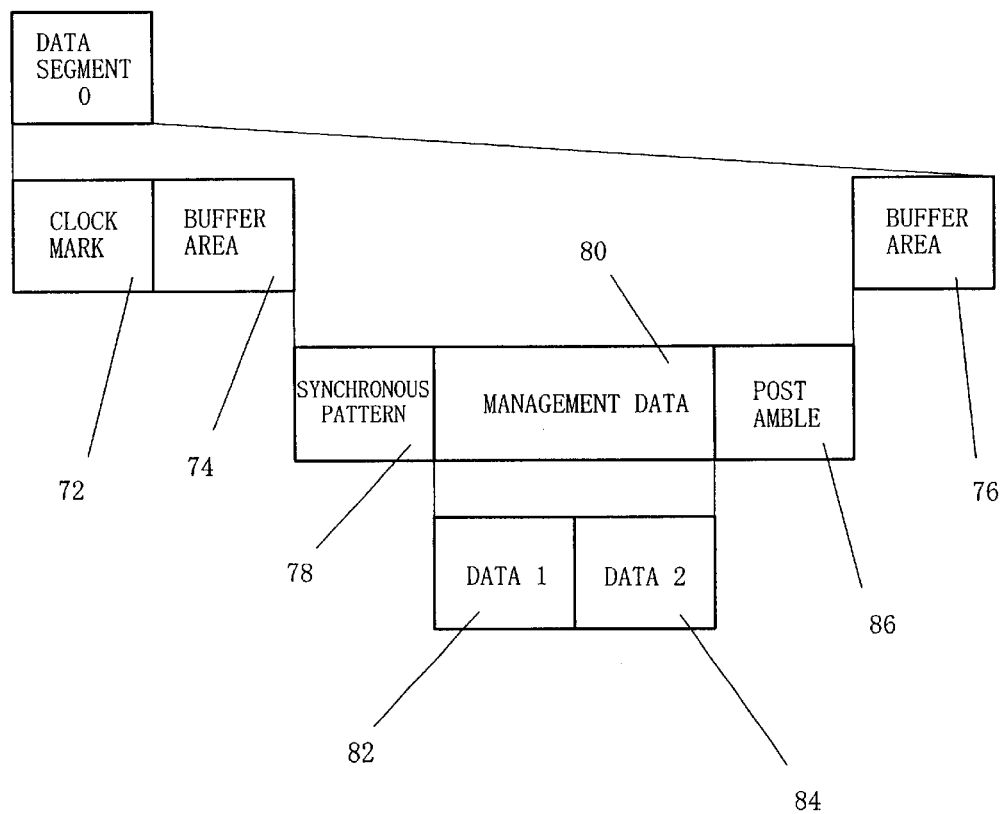
FIG. 3 is a schematic block diagram for explaining an internal structure of data segment 0 shown in FIG. 2.

With reference to FIGS. 1–3, a description will now be given of an optical disc 100 of the present invention. As shown in FIG. 1, the inventive optical disc 100 is a rewritable optical disc having a lead-in area 10, a lead-out area 30, and a user data area 60 between them. Here, FIG. 1 is a plane view of the inventive optical disc 100. The lead-in area 10 and lead-out area 30 constitute a control area 50. The control area 50 stores necessary control data, which will be detailed later. The lead-in area 10 and lead-out area 30 may be arranged in reverse positions.

The lead-in area 10 is an area including control data outside the user data area 60, and is provided at a side from which the disc is first accessed. The lead-out area 30 is a buffer area showing an end of reading, and provided at the innermost or outermost circumference opposite to the lead-in area 10. The lead-in area 10 and the lead-out area 30 are those which a user does not access, and generally store control information and test information. On the other hand, the data area 60 is an area which a user may utilize, and the recordable and reproducible disc 100 uses this area to record video information, voice information, text information, software and other information (or user data).

The optical disc 100 uses control data, which will be detailed with reference to FIGS. 2 and 3, to control an access to the user data. The control data, when recorded as permanent data when the optical disc is manufactured, would assures data recording, while providing a stable and reliable optical disc system.

A description will be given of structures of the lead-in and lead-out areas 10 and 30, with reference to FIG. 2. Here, FIG. 2 is a schematic block diagram for explaining a common data structure between the control and user data areas. The control areas 10 and 30 have the same structure, and one track (or one circumference) is divided into n frames, i.e., frame 0 to frame (n−1). Each frame is divided into a plurality of segments including one address segment and plural data segments. As shown in FIG. 2, (m+1) data segments are provided from data segments 0 to data segment m. Optionally, the control areas 10 and 30 may respectively include different pieces of frames and data segments.

The optical disc 100 of this embodiment writes control data into part of data segments belonging to one frame. For example, control data may be written into the first two data segments in frame 0 in the lead-in area 10 (i.e., data segments 0 and 1) and the last two data segments in frame 0 in the lead-out area 30 (i.e., data segments (m−1) and m). In other words, four data segments, the data segments 0 and 1 in the frame 0 in the lead-in area 10 and the data segments (m−1) and m in the frame 0 in the lead-out area 30 configure the control data, but this is for exemplary purposes only. For instance, control data may be written into data segments 0 to m in the frame 0 in the lead-in area 10 and no control data is recorded in the lead-out area 30.

It is a first characteristic that the optical disc 100 of the instant embodiment does not record control data into one entire track. It is a second characteristic that the control data may be recorded discretely. Here, "discretely" means that all the data segments that store the control data are not arranged continuously. The discrete arrangement may cover different data segments in the same frame (i.e., in the same address), different frames (or different addresses), and different control areas (e.g., the lead-in area 10 and lead-out area 30).

As described, the control data controls an access to the user data, and effects the security of the user data. In general, the level of security depends upon the existence of control data and the difficulty in recognition of the control data. The level of security generally increases as the system becomes complicated. On the other hand, the complicated system would result in an increased cost and lowered reliability. As the system becomes simpler the level of reliability becomes generally higher.

As a solution for this problem, the instant inventors have discovered that it is the most preferable to reduce the data amount of the control data so that the existence of the control data itself becomes hard to be found. Unless the control data is discovered, the control data is not recognized. In addition, when the control data has the small data amount, a structure of the control data may be simple. After considering a function of the control data which will be described later, the instant inventors discovered that such conventional data amount as in control tracks for ISO standard magneto-optical discs is unnecessary for the control data of this embodiment.

In addition, the inventors have discovered that it is preferable to use control area 50 instead of user data area 60 to store the control data. Since the control area 50 is an area which a user does not usually access, it may serve as a dedicated area to maintain the security. Moreover, when the user data area 60 is modulated using wobbles, it would not be compatible with conventional optical discs and disc drives, resulting in an increase in cost. Thereby, the optical disc 100 of the instant embodiment allows use of conventionally standardized optical discs.

The instant inventors have discovered that a record area for control data limited to part of a track would be an effective way to make the existence of the control data inconspicuous. Thus, the area recording control data does not necessarily cover the entire circumference on the disc 100, but may be assigned to only a necessary and sufficient area to record the control data. As control and other information have conventionally been recorded for each track, a wrong-minded person has checked for each track to discover control information using a microscope or the like. On the other hand, the instant embodiment limits a record area for the control data, and thus the above wrong-minded person after scrutinizing part of a track might determine that no control data exist or give up searching for control data.

The instant inventors, addressing that control data is divided and recorded, have discovered that it is preferable to record the control data in plural, physically spaced areas on the control area 50. Control data to be recorded in plural areas are the same or different information among these areas. The same control data redundantly recorded in plural areas would avoid a loss of data when the area becomes defective, thus enhancing the reliability. For example, control data written in the data segment 1 shown in FIG. 2 may be redundant to control data written in the data segment 0. In particular, since the optical disc 100 is subject to rust erosion and thus a loss of data from the innermost or outermost side, it is preferable to redundantly record the control data in both the lead-in and lead-out areas 10 and 30.

Recording of different contents of control data in plural areas enhances the reliability of the control data because the meaningful control data is acquired from acquisitions of all pieces of the control data. If necessary, control-data pieces recorded in plural data segments may be combined into the meaningful control data in accordance with a specific method. For example, control-data pieces in the data segments 0 and 1 in the lead-in area 10 are combined in this order, while control-data pieces in data segments (n−1) and m in the lead-in area 10 are combined in the reverse order. Optionally, one of data segments may define a combining manner of the remaining control-data data segments.

The above arrangement of control data characteristically contributes to a prevention of the control data from being easily discovered by a third party scrutinizing the optical disc 100 with a microscope. Unlike this embodiment, only one of the above characteristics may be used. Control data may be divided among plural, spaced data segments in only the control area 10 or 30.

The control data of this embodiment includes ID data, and error-detectable code data. Optionally, the control data may include data for supplementing the reproduction and use of user data recorded in the data area 60. It is preferable to record control data using a pre-wobble instead of a pre-pit because of a difficulty of recognition in a microscopic test.

The ID data included in the control data serves as an identifier for the optical disc 100, and prevents part or all of the stored user data in the optical disc 100 from being accessed when the dedicated drive which will be described later cannot identify the ID. For example, a person who attempts to steal the optical disc 100 of this embodiment and reproduce it with a general-purpose drive cannot access all of the user data or can access only part of the user data, since the drive does not serve to recognize the ID data of the optical disc 100. In the latter case, it is to be understood that the user data stored in the optical disc 100 can be classified and recorded in accordance with the level of security.

The control data further includes the error-detectable code data, such as a parity code. The error detecting code may check for any impedance during a reading of the control data, e.g., whether the control data is defective or whether the data segment that stores the control data is defective. Thereby, only truly valid control data may be extracted and used, whereby the error detecting code enhances the reliability of the control data. In addition, due to the error detecting code, the control data serves to detect an error. Thus, the control data is not just simple ID data but serves to prevent counterfeit.

Moreover, the instant inventors have discovered that it is preferable to use a clock to record the control data which clock is different from a clock used to record the user data. In recording the control data, it is an easy way to use the clock used to record the user data. However, when a record position is recognized it is apprehended that the control data is easily read out. This embodiment enhances the security level of the control data by configuring the optical disc 100 such that unless it is reproduced by a dedicated drive that may generate two kinds of clocks, no control data is reproduced.

The control data maintains the security for the user data singularly or in combination with data stored in the disc drive. An example of control data that functions singularly is, for example, a predetermined password. An example of control or security data that functions in combination includes, for example, control data that stores an ID number of the optical disc 100 and a hard disc drive in a disc drive which stores the ID number and a verification program for extracting the ID number from the optical disc 100 and comparing it with the stored one. The data stored in the disc drive may be stored in a medium, such as a floppy disc and a CD-ROM, and delivered to a user. In addition, for higher security purposes, a known cryptographic protocol may be related to the control or security data and/or data stored in the hard disc drive. For example, data stored in the disc drive is transmitted online (e.g., through the Internet or a commercial dedicated line) to utilize a digital signature and public/private keys.

Next follows an exemplary structure of data segment in which control data is recorded, with reference to FIG. 3. Here, FIG. 3 is a schematic block diagram for explaining the internal structure of the data segment 0 shown in FIG. 2. Of course, the data segment 0 is not limited to this structure.

The data segment 0 exemplarily includes a clock mark 72, buffer areas 74 and 76, a synchronous pattern 78, control data 80, and a postamble 86. The clock mark 72 is an area to define a synchronous clock signal (or frequency) for a data reproduction. The clock mark 72 collects all clock marks' clocks for respective segments, and uses a PLL to produce a clock signal for data reproduction. This embodiment stores the control data in the data segments 0 and 1 in the lead-in area 10 and the data segments (m−1) and m in the lead-out area 30, among data segments shown in FIG. 2. Thus, clock marks of these four data segments are collected and a synchronous clock signal used to reproduce the control data is generated using the PLL. According to the instant embodiment, the synchronous clock signal for reproducing the control data exemplarily has a period integer times as large as that of a synchronous clock signal for reproducing the user data.

The buffer areas 74 and 76 serve as a buffer part for a constant lead-in by the clock mark 72. The synchronous pattern 78 is an area that defines a trigger indicative of a start point to read the management data. The management data 80 has two data 82 and 84 and stores the control data. One or both of two data stored in the management data 80 may be used as the control data. For example, the data 84 may be configured as parity data for the data 82. If necessary, data in each management data area in each data segment for storing the control data is combined complicatedly to form one control data. The postamble 86 is a preliminary area for adjusting an overrunning bit.

As discussed above, the inventive optical disc 100 uses a clock frequency to record and reproduce control data, which clock frequency is different from a clock frequency used to reproduce user data. Recording and reproducing of the clock mark 72 to the synchronous pattern 78 in FIG. 3 use the same clock frequency as that used to reproduce the user data. On the other hand, recording and reproducing of the management data 80 use the clock frequency different from that used to reproduce the user data. In other words, the control area 50 is reproduced with the user-data clock, the reproduced clock is used for synchronization, then the clock is changed and the management data 80 is reproduced. After the reading ends, the clock returns to the original, user-data clock.

The optical disc 100 thus broadly changes a recording and reproducing method between the user data and control data. Even when the existence of the control data is unveiled, the control data cannot be reproduced using the same reproducing method as the user data. For convenience of the reproducing action, a clock for the control data is set integer times as large as the clock for the user data. Therefore, the inventive optical disc 100 enhances the security for the control data. It is more preferable that an error is detected and indicated on a display when the control data is reproduced in the same manner as that for the reproduction of the user data. Optionally, a clock may be changed for each data segment.

Optionally, a modulation method used for the user data and a modulation method used for the control data may be changed. In addition, a modulation method may be changed in the control data. In the latter example, the NRZ may be used for the data segments 0 and 1, while the Bi-Phase may be used for the data segments (m−1) and m, for instance. The modulation method may use any modulation method known in the art, such as FM, PM, M&M, 1/7, 2/7, 8/16, 4/15, and 8/14.

As described above, an authorized user may receive a program that operates in cooperation with the control or security data as well as data representing a type of clock or modulation method. The user may store the information and program in a storage in an optical disc drive. Those skilled in the art may build such a program that operates on an operation system, such as Windows 98 as an application.

Figure 4:
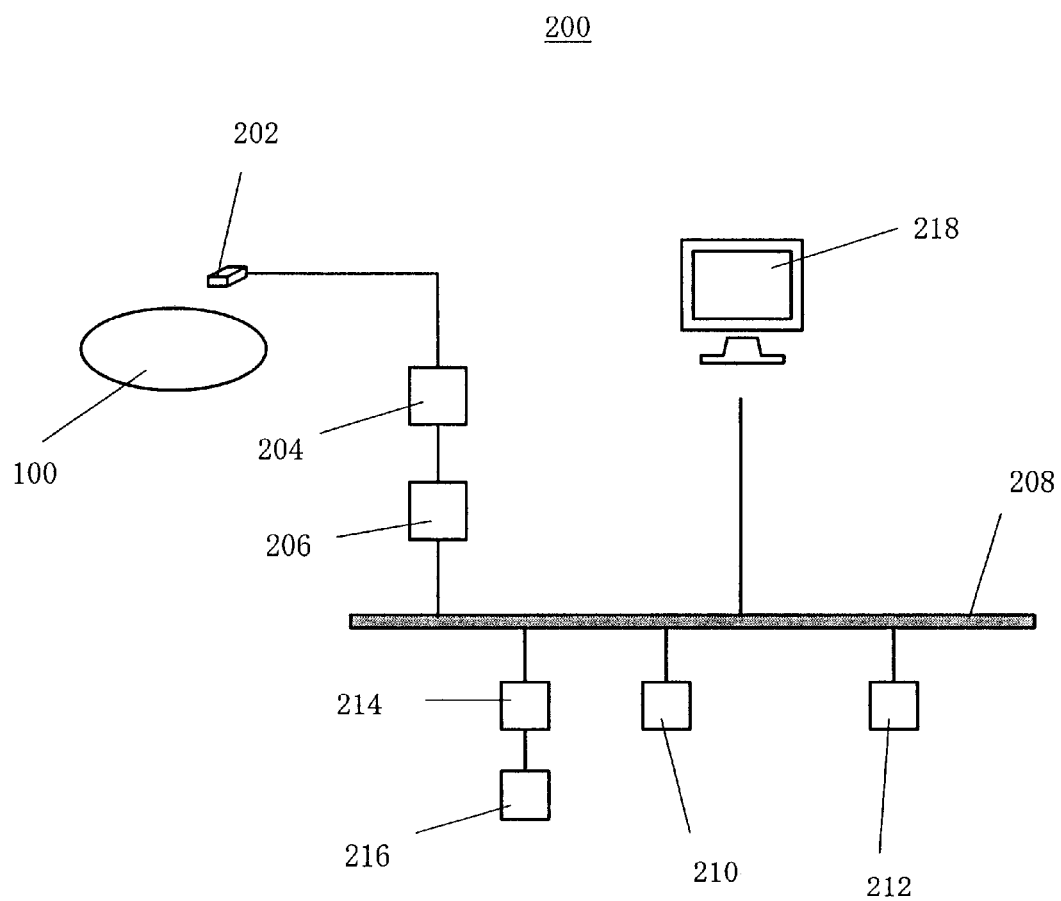
FIG. 4 shows a drive for reproducing the optical disc shown in FIG. 1.
Figure 5:
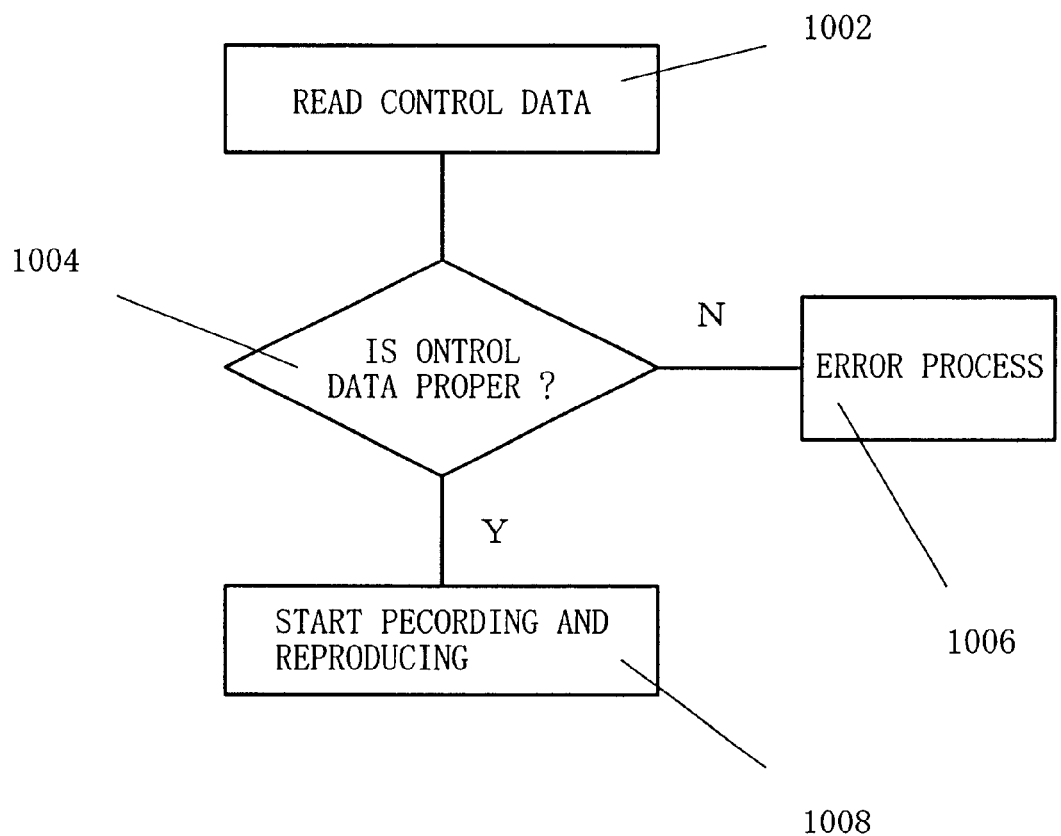
FIG. 5 is a flowchart showing an exemplary applicable security program.

Referring now to FIGS. 4 and 5, a description will be given of a schematic structure an inventive optical disc drive 200 compatible with the inventive optical disc 100, and an example of the above program. The inventive optical disc drive 200 includes an optical pick-up 602, a signal processor 204, a SCSI interface 206, a PCI bus 208, a CPU 210, a main memory 212, an IDE bus 214, a hard disc drive 216, and a display 218.

The optical pick-up 202 reads out both the control data and user data from the optical disc 100, and sends them to the signal processor 204. However, the optical pick-up 202 of this embodiment does not supply, as described later, the control data and user data simultaneously to the signal processor 204, because the control data is first extracted in accordance with the program and then the user data is reproduced when the control data exists in the optical disc 100.

The signal processor 204 may extract original information by demodulating control data and user data as RF signals. An output from the signal processor 204 is fed to the display 218 or a speaker (not shown). Since the control data and user data are recorded as the same RF signal, one signal processor 204 is just enough. In this respect, Japanese Laid-Open Patent Application No. 8-147704, which forms security data using second modulation (or wobbling) means in the user data area in addition to the user data for security purposes, requires two signal processors, resulting in the expensive and complicated drive. On the other hand, the instant embodiment preferably avoids such a structure and uses only one signal processor 204. This will be also described in connection to an error process, which will be described later.

The main memory 212 includes, for example, a RAM and ROM: It temporarily loads a program necessary for CPU 210's action from a hard disc drive 216, temporarily stores an input from input means, such as a keyboard, a mouse, a joy stick, and the like, and stores information necessary for system's actions.

The SCSI interface 206, PCI bus 208, and IDE interface 214 are known in the art, and a detailed description thereof will be omitted herein. Of course, the inventive optical disc drive 200 is not limited to these input/output means, and any input/output means for achieving equivalent effects would be applicable to the inventive optical disc drive 200.

While the hard disc drive 216 stores an operation program, such as Windows 98, and programs necessary for actions of each component (such as various drivers), it further stores the security program in connection to the inventive optical disc 100 and predetermined data for use with this program. The security program is a program which operates with the control data and is supplied in addition to the optical disc 100 at the time of purchasing of the optical disc 100 from a manufacturer or a dealer commissioned by the manufacturer. The security program attempts to prevent an unauthorized user from accessing the user data. Of course, the level of the required security depends upon the levels of the security and confidentiality for the user data. The security program has information on a position at which the control data is recorded on the optical disc 100 and a modulation method used to record the control data.

A description will now be give of an example of the security program with reference to FIG. 5. First, the CPU 210 instructs the optical pick-up 202 to extract the control data (for example, an ID number and any other code of the optical disc 100) from the optical disc 100 (step 1002). As described above, the security program stores information on a position of the control data and a demodulation method (including clock information) for reproduction. Next, the CPU 210 compares the control data with predetermined data (e.g., a list of ID numbers of the optical discs 100 which the optical disc drive 200 has been allowed to reproduce) stored in the hard disc drive 216 (step 1004), and determines whether they accord with each other (in this case, whether they partially accord with each other) (step 1004).

An error process starts when the control data cannot be properly read out, when the read control data is unintelligible, and when the control data is incorrect (step 1006). In the error process, the display 218 indicates an error message and prompts a retrial. In any event, the signal processor 204 cannot reproduce the user data in response to the error process, whereby the user data is prevented from being leaked out. When the control data accords, the CPU 210 allows the signal processor 204 to reproduce the user data (step 1008). Alternatively, when the control data does not accord, an access to only part of the user data, which does not require the security, may be allowed.

Here, it is conceivable to change a modulation method as means for processing an error. However, as described above, a plurality of modulation methods would require a plurality of demodulators, disadvantageously resulting in a complicated and expensive drive. The instant embodiment desirably uses the same demodulation means for demodulation. The instant embodiment uses a clock frequency used to record and reproduce the control data, different from that used for the user data. As a consequence, the instant embodiment changes a demodulation method between the user data and control data while using the same demodulator. A change in clock frequency facilitates the error process. At the time of detection of a synchronous pattern, the clock frequency is changed to the control-data clock frequency, and the control data is demodulated using the control-data clock frequency and read out correctly.

This security program determines whether the authorized optical disc drive 200 reproduces the optical disc 100, but may check for user's ID number. An additional determination of whether an authorized user operates the optical disc drive 200 would further enhance the security. The user's ID number is entered from input means (not shown), such as a keyboard, into the optical disc drive 200. The additional security may be obtained from a known biometric device, such as a fingerprint reader and an iris recognizer. The security would be further enhanced when the optical disc drive 200 is online connected to a central controller through the Internet or a commercial dedicated line, such as America Online, and the central controller authenticates a user.

This embodiment stores the security program, predetermined data used for the program, and a system program (an OS and other programs necessary for actions of each component) in the hard disc drive 216. However, the storage is not limited to the hard disc drive and may use a non-volatile semiconductor memory, such as a flash memory, when the capacity allows.

Of course, the inventive optical disc drive 200 not only reproduces but also records the optical disc 100. As described above, the optical disc 100 of this embodiment is a rewritable type, and a user may add desired data to the user data. Optionally, the optical disc 100 and optical disc drive 200 may enhance the security through an entry and verification of additional information at the time of recording, thereby preventing a distribution of the optical disc 100 whose information has partially been rewritten to incorrect information. Since only a user who is authorized and authenticated may record the user data, a defenseless change of the previously recorded user data may be prevented.

As discussed, the present invention proposes an inexpensive and effective method for stably preserving recorded contents in a recordable and reproducible standard optical disc, and for restricting an access to the optical disc so as to maintain the security of the recorded contents.

Further, the present invention is not limited to these preferred embodiments, and various variations and modifications may be made without departing from the scope of the present invention. For example, the present invention is applicable to any type of optical disc (such as a CD, magneto-optical discs, and DVDs).

According to the inventive optical disc, since the control data is recorded in a control area having an address in part of a circumferential record area, the existence of the control data cannot be detected easily. Therefore, the security for the control data is enhanced in comparison with a recording manner which records the control data along the entire circumference.

The optical disc recording method uses a plurality of synchronous patterns, and allows the desired data to be reproduced only when the proper synchronous pattern is used, whereby the data security is enhanced.

The optical disc drive does not allow the user data in the inventive optical disc to be accessed unless the predetermined condition is satisfied. Therefore, the security for the user data in the optical disc is enhanced.

What is claimed is:

1. A recordable and reproducible optical disc comprising a user data area and a control area, said user data and control areas being continuously and integrally arranged, wherein each record area in said user data and control areas is divided along a circumference of the optical disc, and each unit of the divided circumference is addressed, wherein each addressed unit is divided into and recorded with a plurality of data lines, and wherein control data including error-detectable code data and ID data is recorded in at least part of the plurality of data lines in said control area in a synchronous pattern having a minimum basic period different from a minimum basic period for a synchronous pattern for reproducing data divided and recorded in the data lines.

2. A recording method for a recordable and reproducible optical disc comprising a user data area and a control area, the user data and control areas being continuously and integrally arranged, wherein each record area in said user data and control areas is divided along a circumference of the optical disc, each unit of the divided circumference is addressed, and each addressed unit is divided into a plurality of data lines so that said optical disc may be recorded, said method comprising a step of recording control data including error-detectable code data and ID data in at least part of the plurality of data lines in the control area using a synchronous pattern having a minimum basic period different from a minimum basic period used for a synchronous pattern for reproducing data divided and recorded in the data lines.

3. An optical disc drive for driving a recordable and reproducible optical disc comprising a user data area and a control area, the user data and control areas being continuously and integrally arranged, wherein each record area in the user data and control areas is divided along a circumference of the optical disc, each unit of the divided circumference is addressed, and each addressed unit is divided into and recorded with a plurality of data lines, and wherein control data including error-detectable code data is recorded in at least part of the plurality of data lines in the control area in a synchronous pattern having a minimum basic period different from a minimum basic period for a synchronous pattern for reproducing data divided and recorded in the data lines, said optical disc drive comprising:

an optical pick-up for reproducing the optical disc;

a signal processor, connected to said optical pick-up, for processing an output from said optical pick-up;

a memory for storing a security program and security data relating to information on the control data; and a controller for operating in accordance with the security program, and allows said optical pick-up and signal processor to record and reproduce the user data when the control data reproduced by said optical pick-up accords with the security data and when no error is detected during a reproduction action.

* * * * *